United States Patent [19]

Flowerday et al.

[11] 4,390,202

[45] Jun. 28, 1983

[54] VISOR CONTROL

[75] Inventors: Carl Flowerday; Konrad H. Marcus, both of Holland; Gordon Kempkers, Hamilton; Edward T. Boerema, Zeeland; Dennis J. Fleming, Holland, all of Mich.

[73] Assignee: Prince Corporation, Holland, Mich.

[21] Appl. No.: 267,431

[22] Filed: May 26, 1981

[51] Int. Cl.³ .......................... B60J 3/02; F16C 17/00
[52] U.S. Cl. .............................. 296/97 K; 160/DIG. 3
[58] Field of Search ................. 296/97 K, 97 R, 97 F, 296/97 H, 97 J; 160/DIG. 3

[56] References Cited

U.S. PATENT DOCUMENTS

| | | | |
|---|---|---|---|
| 1,426,716 | 8/1922 | Custer | 160/DIG. 3 |
| 1,461,289 | 7/1923 | Primrose | 296/97 R |
| 1,671,180 | 5/1928 | Dahl | 296/97 K |
| 1,686,341 | 10/1928 | Nathanson | 296/97 K |
| 1,837,546 | 12/1931 | Hartzell | 296/97 R |
| 2,607,906 | 8/1952 | Sang | 296/97 R |
| 2,813,749 | 11/1957 | Wetig | 296/97 R |
| 3,199,913 | 8/1965 | Field et al. | 296/97 K |
| 3,477,678 | 11/1969 | Icke et al. | 296/97 K |
| 4,070,054 | 1/1978 | Gziptschirsch | 296/97 K |

Primary Examiner—Richard A. Bertsch

Attorney, Agent, or Firm—Price, Heneveld, Huizenga & Cooper

[57] ABSTRACT

A visor control includes a first member positioned in the body of the visor and engaging one side of a pivot rod also extending within the visor body for moving the visor between stored and use positions. An elastically deformable plate has one end secured to the first member and engages an opposite side of the pivot rod in an elastically deformed position. The rod includes a flat formed in the opposite side for engagement by the deformable plate to provide a torque for returning the visor to a predetermined position and for releasably holding the visor in such position. In one embodiment of the invention, the first member is also an elastically deformable plate which engages flats formed in the one side of the pivot rod. In yet another embodiment of the invention, collar shaped cam members surround the pivot rod and a compression spring urges the cam members together, one of which is anchored to the pivot rod and the other of which is rotationally anchored to the visor body but is free to slide on the visor rod. Each of the cam members includes interengaging inclined surfaces for urging the visor under the spring compression into a predetermined position and releasably hold the visor in such position.

31 Claims, 16 Drawing Figures

VISOR CONTROL

BACKGROUND OF THE INVENTION

The present invention relates to a visor assembly and particularly to a control for returning and holding the visor to a stored position.

Visor assemblies for use in vehicles such as automobiles typically use a friction mechanism between the pivot rod and the visor body to allow the visor to be adjusted to a desired rotational position about the visor rod and held in that position. The friction mechanism must however permit relatively easy adjustment of the visor and yet hold the visor in a desired position. When the visor is in a stored position pivoted upwardly against the vehicle's headliner, frequently as the vehicles travel along the highway, the visor can, with such frictional devices slip down from the stored position thereby becoming not only somewhat unsightly, but also if lowered to a sufficient degree, can become a safety hazard to passengers within the vehicle in the event of an accident.

Some lightweight visors, such as European type visors, are of wire rod frame construction and filled with foam material. Such a visor is disclosed for example in U.S. Pat. No. 4,070,054, and employs a lightweight U-shaped clip which extends between the visor body and the visor pivot rod and bears against flat surfaces on the pivot rod to assist in holding the visor in a stored position. Although such construction is helpful for holding such lightweight (about 13 ounces) visors in a stored position, the relatively lightweight spring clip is not effective in returning the visor to the stored position. Such construction would not be effective in maintaining heavier visors (i.e. about 2 pounds) such as those which include a lighted mirror assembly in a stored position let alone, return such a visor to the stored position as it is moved in the direction of the headliner.

SUMMARY OF THE PRESENT INVENTION

The visor construction of the present invention provides a snap-up visor which as a visor is moved toward the stored position, will effectively snap the visor up against the headliner of a vehicle and securely but releasably hold the visor in the stored position. The device is effective for use with relatively heavy visors employed, for example, with lighted vanity mirror visor assemblies of the type disclosed in U.S. Pat. No. 4,227,241 which weigh approximately 2 pounds.

Visor construction of the present invention includes a visor body having a first member positioned within the visor body and engaging one side of the visor pivot rod. Mounted to the first member and extending on an opposite side of the pivot rod is an elastically deformable plate which engages the visor rod with significant pressure. The visor rod includes a flat formed along at least one side thereof and selectively engaged by the plate and cooperating therewith for urging the visor body into an equilibrium position with the surface of the plate contacting the flat formed on the visor pivot rod when the visor is in a stored position.

In one embodiment of the invention, flats are formed on opposite sides of the visor rod and the first member is also elastically deformable and engages at least one of the flattened surfaces to provide an increased torque for moving the visor to the stored position. In still a further embodiment of the present invention, a compression spring coaxially surrounds the visor pivot rod and cam follower means, is axially movable along the visor rod and engages a stationary cam mounted to the pivot rod for moving the visor to a stored position and for releasably securing the visor in the stored position.

Thus, the present invention provides a visor control which provides snap-up operation of a visor. Another feature of the present invention is that the control structure can be employed with relatively heavy visors and is useful in holding the visors in a stored position permitting only desired movement of the visor from the stored position and holding the visor in an adjusted position. These and other features, objects and advantages of the present invention will become apparent upon reading the following description thereof together with reference to the drawings in which:

DETAILED DESCRIPTION OF THE PREFERRED EMBODIMENT

Figure 1:
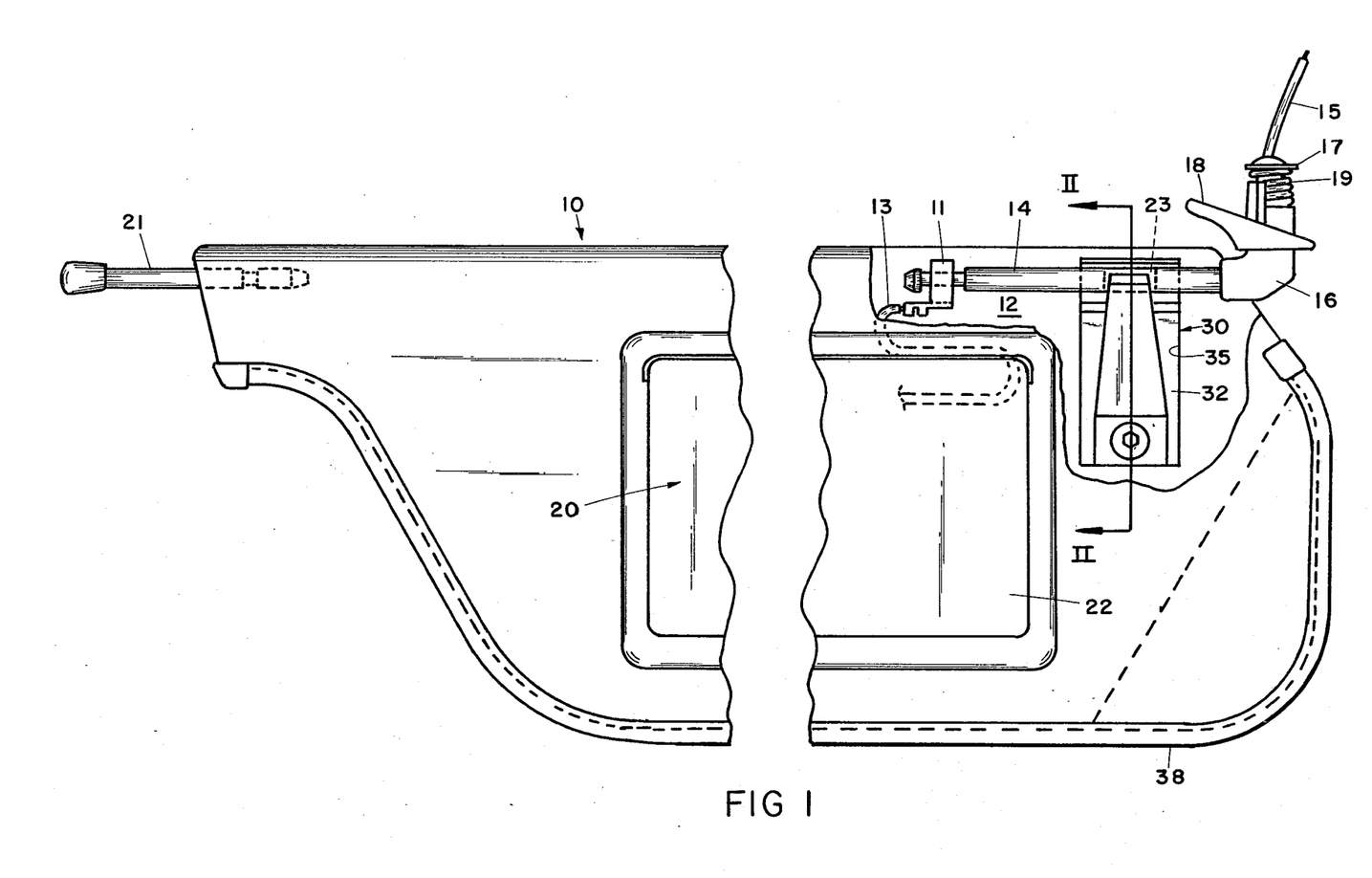
FIG. 1 is a fragmentary front elevational view of a visor incorporating the present invention shown partly broken away.
Figures 10, 11:
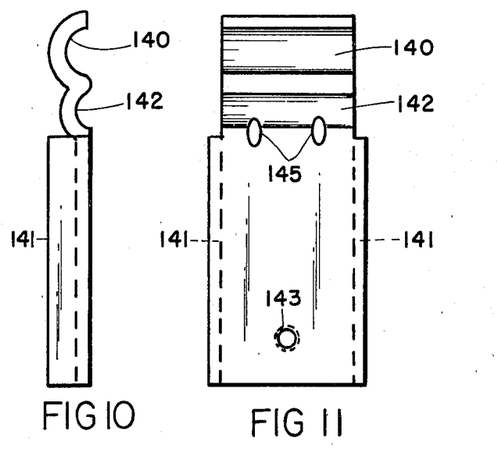
FIG. 10 is an enlarged left side elevational view of an alternative embodiment of one element of the present invention.
FIG. 11 is a front elevational view of the structure shown in FIG. 10.

Referring initially to FIG. 1 there is shown a visor 10 incorporating a visor position control 30 of the present invention. Visor 10 is of the type which includes a lighted and covered vanity mirror subassembly 20 secured within the molded polymeric body or core 12 of the visor through one side thereof. Visor 10 is shown in FIG. 10 in a lowered position in which the cover 22 of the mirror assembly can be raised illuminating a mirror therein for permitting a vehicle occupant to use the mirror under any ambient lighting conditions.

Visor 10 includes a pivot rod 14 extending therein along one edge and having one end secured to elbow 16 coupled to a mounting flange 18, which in turn, is secured to a vehicle headliner by appropriate mounting screws. The elbow and mounting plate 18 are secured by a conventional compression spring 19 and washer 17 to provide a frictional pivot for moving the visor from the windshield area of the vehicle to a side window if desired. An electrical wire 15 for providing operating power for the lights associated with the illuminated vanity mirror assembly 20 is fed through elbow 16, while a ground wire 13 is coupled to one end of pivot rod 14 by means of a suitable electrical clip 11 providing the ground return path for the electrical operating power supplied to the illuminated vanity mirror subassembly. At an end of visor 10 remote from elbow 16 there is provided a post 21 for securing the visor to a conventional socket (not shown) mounted between the pair of visors for supporting this end of the visor when in a position adjacent the vehicle windshield. The pivot rod 14 is press fit into elbow 16 so as to remain stationary with respect to the elbow. Visor 10 including the lighted and covered mirror subassembly 20 and the general core construction is disclosed in detail in the above identified U.S. Pat. No. 4,227,241 issued on Oct. 7, 1980 and assigned to the present assignee the disclosure of which is incorporated herein by reference. Covering the molded polymeric body 12 of the visor as seen in FIGS. 2 and 3 is a padded upholstery material 36 surrounded along the edges as seen in FIG. 1 by a suitable bead 38 to provide a finished appearance to the visor construction.

The visor body 12 is molded to include a rod receiving generally cylindrical opening along the top edge as seen in FIG. 1. Extending axially along a portion of the length of pivot rod 14 is a flattened segment 23 as best seen in FIGS. 2 and 3 which extends radially into the rod slightly less than halfway. As seen in FIG. 1, flat 23 extends axially a distance slightly greater than the width of the upper end 49 of plate 34 of the control assembly 30.

Figure 2:
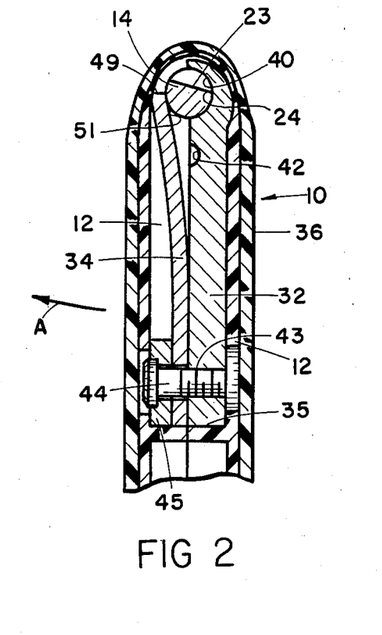
FIG. 2 is a fragmentary cross-sectional view of the visor control shown in FIG. 1 taken along section lines II—II of FIG. 1.
Figure 3:
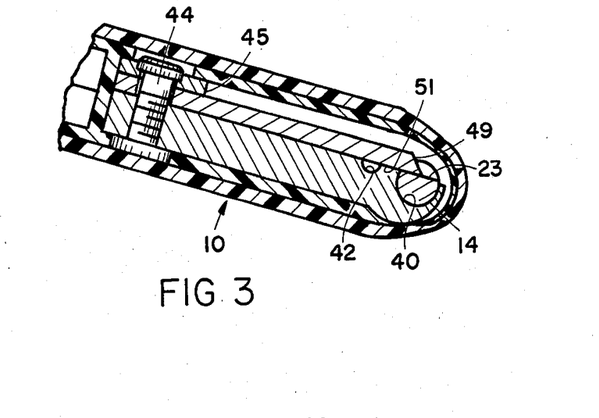
FIG. 3 is a cross-sectional view of the structure shown in FIG. 2 shown with the visor rotated to a stored position.

The visor control 30 of the present invention as seen in FIGS. 1 through 5 also includes a first member 32 and a second member 34, both of which are mounted within a recess 35 formed within the body 12 of visor 10. As seen in FIG. 1, recess 35 has a width corresponding to the width of the generally rectangular first member 32 so as to securely receive the same which can, if desired, be cemented or otherwise secured to body 12 within recess 35. The first member 32 of the visor control assembly 30 comprises a rigid generally rectangular member serving as an anchor member in the embodiment shown in FIGS. 1 through 5. Member 32 includes a transversely extending semi-circular or convexly curved first recess 40 having a radius of curvature corresponding to that of the circular pivot rod 14 for seating against and partially circumscribing the same as shown in FIGS. 2 and 3. Spaced vertically below recess 40 is a smaller semi-circular recess 42 which receives a semi-cylindrical solid tool which is inserted and rotated to bend plate 34 for installation onto the pivot rod 14 as explained below. Member 32, in the preferred embodiment, was made of 6061 T6 aluminum having a thickness of about 0.34 inches, a width of 1.63 inches, and a vertical height of approximately 3 inches. A centered threaded aperture 43 near the lower edge of member 32 receives a cap screw 44 which extends through a generally rectangular cover plate 45 and the elastically deformable second member or plate 34 for securing members 32 and 34 together at their lower ends.

Figure 4:
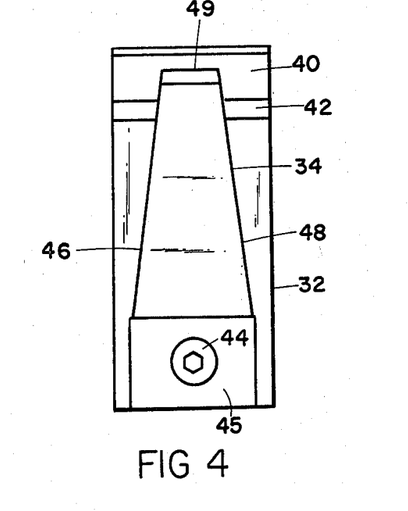
FIG. 4 is an enlarged front elevational view of the control structure shown in FIGS. 1 through 3.

Plate 34 as best seen in FIGS. 1 and 4 has a lower end which is generally rectangular and dimensioned to fit under plate 45 which has a width of 1.06 inches and a height of 0.75 inches. Member 34 has edges 46 and 48 which taper upwardly to form a truncated triangle having a beveled upper end 49 with a width of 0.5 inches which is slightly less than the length of flat 23 formed on rod 14 and is centered in alignment therewith as seen in FIG. 1. The tip of end 49 is generally centered over the axis of rotation of rod 14. Edges 46 and 48 are tapered to uniformly distribute stresses in plate 34 when deflected as shown in FIG. 2. Elastically deformable plate 34 is made of 1074 annealed spring steel which is heat treated and tempered to a rockwell hardness of between 44 and 49. It is subsequently shot peened to remove burrs and surface stresses and bears against the pivot rod 14 which has a diameter of approximately 0.37 inches with a carburized and hardened surface.

Figure 5:
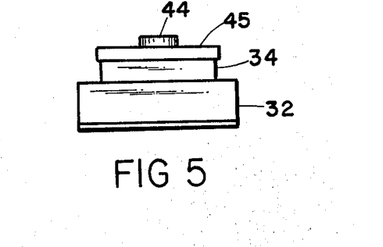
FIG. 5 is a bottom plan view of the structure shown in FIG. 4.

During manufacture and assembly of the visor control, members 32 and 34 are secured together as shown in FIGS. 4 and 5 with cap screw 44 and cover plate 45. This assembly is then inserted into recess 35 of the visor core and the tool is inserted within slot 42 and rotated to bend deformable plate 34 permitting admission of the pivot rod 14 within the socket defined by semi-circular longitudinally extending recess 40. With the visor in a downwardly extending vertical position as shown in FIGS. 1 and 2, the flat 23 faces forwardly of the vehicle. As the visor is rotated clockwise as indicated by arrow A in FIG. 2, the lineally extending edge 24 of the flattened surface 23 engages the inner flat surface 51 of plate 34 creating a rotational torque tending to raise the visor into an equilibrium position shown in FIG. 3 with surface 51 parallel to and abutting flat 23. This occurs when the visor is in the stored position approximately 10° above the horizontal as shown in FIG. 3. The point at which the visor control assembly moves the visor or snaps it up to the stored position as shown in FIG. 3 is approximately 20° below horizontal thus providing a total of approximately 30° of visor movement into the stored position as the visor is manually moved toward the headliner. In the preferred embodiment of the invention, the torque provided by the visor control in automatically moving the visor was from 3 to 10 inch pounds. In the preferred embodiment also, it took approximately 25 to 40 inch pounds to lower the visor from the stored position shown in FIG. 3 by rotating it in a counterclockwise direction around pivot rod 14. Thus, the control means of the preferred embodiment of the invention shown in FIGS. 1 through 5 provides a secure stored position for the visor. When the visor is in a lowered position, such as shown in FIG. 2, the visor control mechanism provides a holding force of approximately 12 to 20 inch pounds preventing inadvertent movement of the visor once adjusted to a desired position. As can be seen by providing a flat 23 extending partly into the pivot rod 14, the visor once pivoted downwardly from the headliner can be adjusted to any normal sun-blocking position and yet will be returned and securely held in the stored position as shown in FIG. 3.

Figure 12:
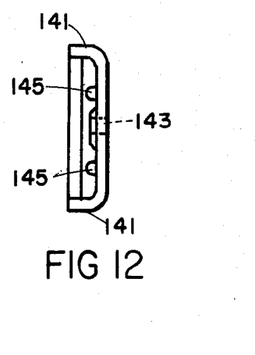
FIG. 12 is a bottom plan view of the structure shown in FIG. 11.

As an alternative construction to the relatively thick member 32 employed in conjunction with the embodiment shown in FIGS. 1 through 5, plate 32 can be made as shown in FIGS. 10 through 12 in which a relatively thin stamped steel plate 132 is shown. Plate 132 can be formed of, for example, 12 gauge 1074 annealed spring steel heat treated and tempered to a rockwell hardness of from 44 to 49. It includes a pair of transversely extending semi-circular recesses 140 and 142 functionally corresponding to recesses 40 and 42 respectively of plate 32. As seen in FIG. 12, the body of plate 132 is of generally shallow U-shaped cross section having a pair of reinforcing legs 141. The grain structure of the steel extends vertically and a pair of stiffening gussets 145 are formed at the junction of the body with the upper section to prevent deflection. A threaded aperture 143 is provided for receiving a fastener for securing the second member 34 by fasteners such as a cap screw.

In the embodiment shown in FIGS. 1 through 5, and the alternative first member shown in FIGS. 10 through 12, only member 34 is elastically deformable to provide a torque against pivot rod 14 for returning the visor to a predetermined position which is the stored position in the preferred embodiment and for holding the visor in a desired adjusted position. In the embodiment shown in FIGS. 6 through 9 now described, a pair of elastically deformable members are employed which bear against opposite sides of a pivot rod to provide the same type of visor control in a somewhat different manner.

Figure 6:
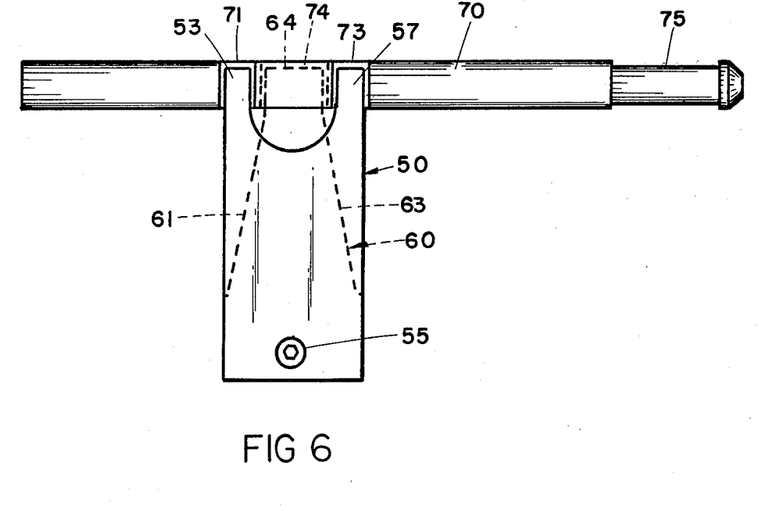
FIG. 6 is a front elevational view of an alternative embodiment of the present invention.
Figure 7:
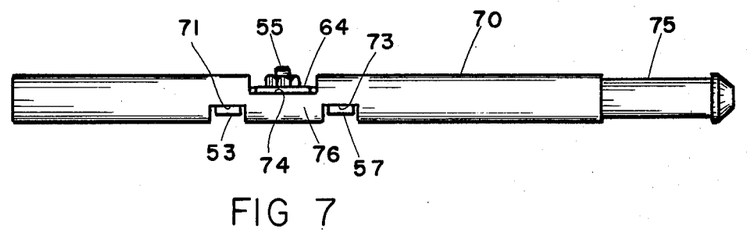
FIG. 7 is a top plan view of the structure shown in FIG. 6.
Figure 8:
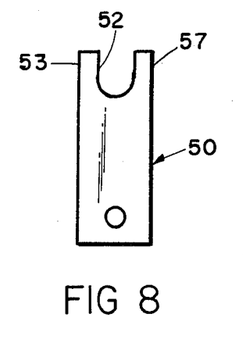
FIG. 8 is a front elevational view of a portion of the structure shown in FIGS. 6 and 7.
Figure 9:
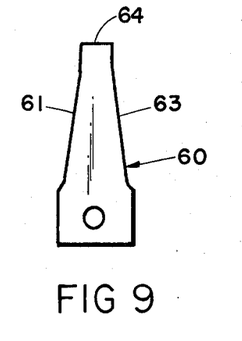
FIG. 9 is a front elevational view of another portion of the structure shown in FIGS. 6 and 7.

In the alternative embodiment shown in FIGS. 6 through 9, a pair of elastically deformable plates 50 (FIG. 8) and 60 (FIG. 9) are joined along their lower edge by means of a bolt 55 (FIGS. 6 and 7). Element 50 comprises a generally rectangular member having a U-shaped cutaway 52 defining a pair of vertically extending spaced ends 53 and 57 which urge against longitudinally spaced flats 71 and 73 formed partly through one side of a pivot rod 70. Member 60 is similar in shape to member 34 of the first embodiment and includes tapered edges 61 and 63 terminating in a rectangular tip 64 which engages a flat 74 centered on a side of pivot rod 70 opposite from and between flats 71 and 73. The visor control structure defined by members 50 and 60 when secured to one another as shown in FIGS. 6 and 7, is mounted to the visor body in the same manner as assembly 30 shown in FIG. 1 with the end 75 of pivot rod 70 being secured within elbow 16 of the visor assembly.

As the visor is rotated from the stored position in which the plates 50 and 60 are in the position shown in FIGS. 6 and 7 to a downward position, contact areas 53, 57 and 64 of the control means engage edges of the flat surfaces 71, 73 and 74 respectively which tends to hold the visor in the stored position. Once the visor has been moved approximately 30° downwardly from the stored position, these contact portions of deformable plates 50 and 60 engage the cylindrical surface portion 76 of pivot rod 70 thereby permitting relatively free movement of the visor and yet provide sufficient holding torque for holding the visor in a desired adjusted position. As the visor is moved toward the stored position, ends 53, 57 and 64 engage the offset edges of the flats 71, 73 and 74 respectively urging the visor into the stored position in the same manner as deformable member 34 engages edge 24 of the structure shown in FIGS. 2 and 3 to urge the visor into the stored position. Thus, snap-up action is achieved by the structure shown in FIGS. 6 through 9 employing a pair of elastically deformable plates cooperatively engaging flats on opposite sides of the pivot shaft.

Figure 13:
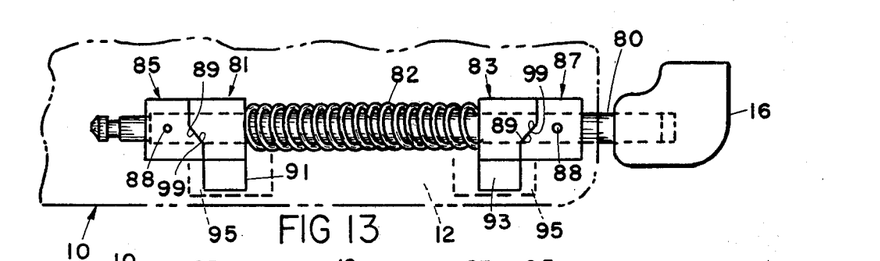
FIG. 13 is a fragmentary front elevational view of a visor including another embodiment of the present invention shown with the visor in phantom form and in a stored position.
Figure 14:
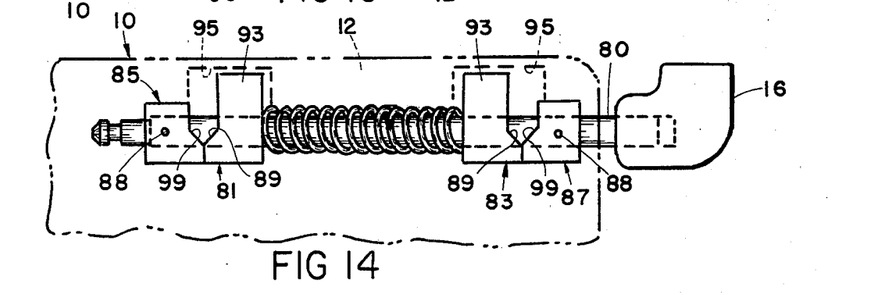
FIG. 14 is a fragmentary front elevational view of the structure shown in FIG. 13 shown with the visor rotated to a lowered position.

Another embodiment of the present invention is shown in FIGS. 13 and 14 in which a pivot rod 80 is anchored at one end to visor elbow 16 and extends into the body of the visor assembly 10. Coaxially surrounding the pivot rod 80 is a compression spring 82 which urges a pair of cam followers 81 and 83 away from one another and into engagement with cam means 85 and 87 respectively, each of which are fixedly secured to pivot rod 80 by means of roll pins 88 extending through pivot rod 80 and cams 85 and 87 respectively.

The cam followers 81 and 83 are each cylindrical collars and include tapered camming surfaces 89 formed by cutting the cylindrical members 85 and 87 transversely in the pattern shown in FIGS. 13 and 14 to provide an inclined surface 89 which extends at an angle to the axis of shaft 80 of approximately 45°. As can be appreciated, this cut provides a camming surface 89 including two opposed partial annular flat surfaces joined by a pair of opposed partial annular inclined surfaces.

Cam followers 81 and 83 integrally include tab means 91 and 93 respectively which extend in longitudinal slots 95 formed in the molded polymeric body 12 of the visor assembly 10 for preventing relative rotation of the cams 81 and 83 with respect to the visor body. The slots 95 have a length sufficient to permit movement of the cam members axially with respect to pivot rod 80 as seen in FIGS. 13 and 14, while restraining such members from rotational movement. The tab and slot arrangement is similar to that disclosed with respect to the embodiment shown in FIG. 16 as described below.

Cam members 81 and 83 are cylindrical collars which surround rod 80 and are free to slide along the rod. They each include a mating inclined surface 99 which engages corresponding surfaces 89 of the cam followers 85 and 87 respectively and is similarly inclined. As seen in FIG. 13 with visor assembly 10 in the stored position, surfaces 89 and 99 interengage along their entire mating sections with followers 81 and 83 being fully extended against cam members 85 and 87. The interfitting surfaces hold the visor in the stored position and tend to resist movement from such position. As the visor is manually moved to a downward adjusted position such as that shown in the FIG. 1 embodiment, surfaces 89 and 99 slide with respect to one another forcing cam followers 81 and 83 inwardly compressing spring 82 with tabs 91 and 93 sliding within slots 95 to a position as shown in FIG. 14. In this position the outer peripheral semi-annular contact surfaces of the cam and cam followers engage to provide a frictional holding force for holding the visor in an adjusted position. As can be appreciated, as the visor is returned toward the stored position, the inclined surfaces 89 and 99 tend to seek the equilibrium position as shown in FIG. 13 thereby snapping the visor up to the stored position as shown in this figure.

Figure 15:
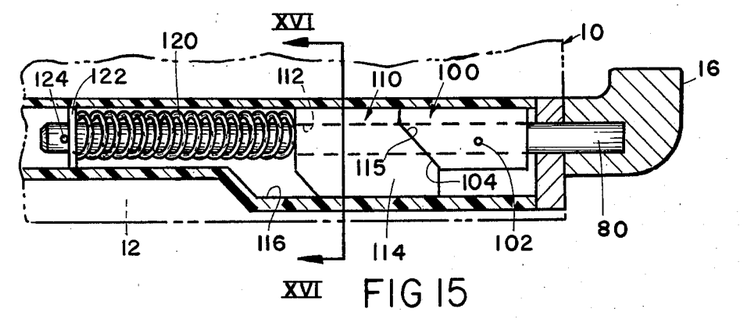
FIG. 15 is an enlarged fragmentary cross-sectional view of a visor including another embodiment of the present invention.
Figure 16:
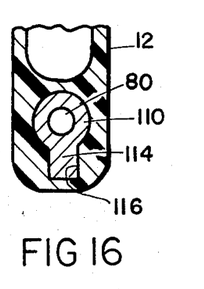
FIG. 16 is a cross-sectional view taken along section lines XVI—XVI of FIG. 15.

Another embodiment of the present invention is shown in FIGS. 15 and 16 which is similar in operation to that shown in FIGS. 13 and 14 but which employs a single cam and cam follower 100 and 110 respectively. In the embodiment shown in FIGS. 15 and 16 the pivot shaft 80 is secured at one end to an elbow 16 as before and extends into the body 12 of a visor 10. The cam 100 comprises a collar secured to pivot rod 80 by means of a roll pin 102 and includes a transversely beveled camming surface 104 at an end facing cam follower 110. Follower 110 is slidably fitted on pivot rod 80 and includes a centrally extending aperture 112 for slidably fitting the follower onto rod 80. It integrally includes a downwardly projecting tab 114 which is slidably secured within a slot 116 formed in the visor body 12 permitting movement of follower 110 axially along rod 80 but restraining rotational movement thereof with respect to the visor body. Follower 110 also includes an inclined camming surface 115 corresponding in profile to that of surface 104 and similar to the camming surfaces disclosed with respect to the embodiment shown in FIGS. 13 and 14. Thus, the surface includes a transversely extending segment communicating with a beveled segment extending approximately 45° with respect to the axis of pivot shaft 80 and a second transversely extending segment on the opposite side. Follower 110 is compressibly held against cam 100 by means of a compression spring 120 surrounding shaft 80 and anchored at its opposite end by means of a washer 122 held in place by means of a roll pin 124 extending transversely through the end of pivot rod 80.

Compression spring 120 urges cam 110 into a position with surfaces 104 and 115 fully mating as shown in FIG. 15 when the visor is in a raised stored position as shown. As the visor is moved downwardly, the cam members 100 and 110 rotate with respect to one another in the same manner as similarly shaped cams as shown in FIG. 14 to provide a frictional holding force for the visor in a downward adjusted position. As the visor is returned toward the stored position however, the surfaces 104 and 115 tend to seek the equilibrium position shown in FIG. 15 thereby snapping the visor up to the stored position. In the embodiment shown in FIGS. 13 through 16, the cam and cam followers are made of hardened steel material to provide wear resistance to the relatively large pressures applied between the camming surfaces thereof. The surfaces are prepared in conventional manners and the spring 82 and 120 is selected to provide the pull-up torque of approximately 3 to 10 inch pounds as in the previous embodiments.

It will become apparent to those skilled in the art that various modifications of the preferred embodiments of the invention disclosed herein can be made without departing from the spirit or scope of the invention as defined by the appended claims.

The embodiments of the invention in which an exclusive property or privilege is claimed are defined as follows:

1. A visor control for a vehicle mounted visor for providing snap-up operation of the visor against the vehicle's headliner comprising:
   a visor body including a cylindrical pivot rod extending therein along one edge of said body; and
   a visor control member positioned in said visor body and including a bifurcated portion extending into engagement with one side of said pivot rod, and a second portion defining an elastically deformable plate extending to engage an opposite side of said pivot rod in alignment in opposed relationship between the bifurcated portion, wherein said pivot rod includes at least a flat formed in said opposite side for engagement by said plate to provide a torque to said visor body to return said visor body to a stored position adjacent the vehicle headliner as the visor is moved toward the stored position and releasably hold the visor in the stored position.

2. The apparatus as defined in claim 1 wherein said bifurcated portion is rigid.

3. The apparatus as defined in claim 1 wherein said plate is made of spring steel about 0.15 inches thick.

4. The apparatus as defined in claim 3 wherein the edges of said plate are tapered inwardly in a direction along said plate toward said pivot rod.

5. The apparatus as defined in claim 4 wherein said portion of said bifurcated member engaging said pivot rod is concavely curved to circumscribe at least a portion of said pivot rod.

6. The apparatus as defined in claim 5 wherein said flat formed in said pivot rod extends less than halfway through said rod and defines an edge at the junction of said flat with the outer surface of said rod against which said plate bears to apply a torque to said pivot rod for returning said visor to a stored position.

7. The apparatus as defined in claim 6 wherein said bifurcated member includes a recess for receiving an assembly tool for forcing said plate away from said first member to allow said pivot rod to be inserted therebetween.

8. The apparatus as defined in claim 7 wherein said bifurcated member is formed of a relatively thin sheet of material in a shallow U-shaped cross section to include strengthening edges.

9. The apparatus as defined in claim 1 wherein said bifurcated portion is an elastically deformable plate and wherein said one side of said pivot rod also includes flat means formed therein and positioned to be engaged by said bifurcated portion such that said bifurcated portion and said plate compressively engage opposite sides of said pivot rod for cooperatively providing a torque to said visor body for returning the visor to the stored position.

10. The apparatus as defined in claim 9 wherein said portion bifurcated engaging said flat means comprises a pair of spaced end segments integral with said deformable plate and wherein said flat means comprises a pair of flats axially spaced along said pivot rod on opposite sides of said flat on said opposite side of said pivot rod and aligned with said end segments of said first member.

11. A visor control for a vehicle mounted visor for returning and releasably holding the visor in a predetermined position comprising:
   a visor including a pivot rod extending therein for pivotally mounting the visor to a vehicle for adjustable movement;
   a first member coupled to said visor and engaging one side of said pivot rod; and
   an elastically deformable plate having one end secured to said first member and engaging an opposite side of said pivot rod in an elastically deformed position, wherein said pivot rod includes a flat formed in said opposite side for engagement by said plate to provide a torque to said visor body to return said visor body to a predetermined position as the visor is moved toward said predetermined position and releasably hold the visor in said predetermined position.

12. The apparatus as defined in claim 11 wherein said first member is rigid.

13. The apparatus as defined in claim 12 wherein said plate extends generally orthogonally to said pivot rod and the edges of said plate are tapered inwardly in a direction along said plate toward said pivot rod.

14. The apparatus as defined in claim 13 wherein said first member includes a concavely curved seat formed therein for receiving and partly circumscribing said pivot rod.

15. The apparatus as defined in claim 14 wherein said first member includes a recess for receiving an assembly tool for forcing said plate away from said first member to allow said pivot rod to be inserted therein.

16. The apparatus as defined in claim 15 wherein said first member is formed of a relatively thin sheet of material having a shallow U-shaped cross section to provide rigidity.

17. The apparatus as defined in claim 11 wherein said first member is an elastically deformable plate and wherein said one side of said pivot rod also includes flat means formed therein and positioned to be engaged by said first member such that said first member and said plate compressively engage opposite sides of said pivot rod for cooperatively providing a torque to said visor body for returning the visor to the predetermined position.

18. The apparatus as defined in claim 17 wherein said portion of said first member engaging said flat means comprises a pair of spaced end segments integral with said deformable plate and wherein said flat means comprises a pair of flats axially spaced along said pivot rod on opposite sides of said flat on said opposite side of said pivot rod and aligned with said end segments of said first member.

19. A visor control for a vehicle mounted visor for returning and holding the visor in a predetermined position comprising:
a visor including a pivot rod extending therein for pivotally mounting the visor to a vehicle for adjustable movement;
one of a cam or cam follower coupled to said pivot rod and including a camming surface facing axially toward one end of said rod;
the other of said cam or cam follower captively and slidably secured to said visor for movement axially with respect to said pivot rod and including a camming surface axially facing an opposite end of said pivot rod; and
means for urging said cam follower into engagement with said cam such that said camming surfaces engage one another to tend to rotate said visor into an equilibrium position and releasably hold said visor in said equilibrium position.

20. The apparatus as defined in claim 19 wherein said cam and cam followers are collars surrounding said pivot rod.

21. The apparatus as defined in claim 20 wherein said urging means comprises a spring surrounding said pivot rod and coupled to said cam follower.

22. The apparatus as defined in claim 21 wherein said cam follower is axially movable along said pivot rod and includes means engaging said visor preventing rotational movement between said visor and said cam follower.

23. The apparatus as defined in claim 22 wherein said engaging means comprises a tab extending from said cam follower and a tab receiving slot formed in said visor body permitting said cam follower to move in an axial direction only.

24. The apparatus as defined in claim 23 wherein said spring is a compression spring having one end anchored to said pivot rod and an opposite end engaging said cam follower.

25. A visor control for a vehicle mounted visor for returning and holding the visor in a predetermined position comprising:
a visor including a pivot rod extending therein for pivotally mounting the visor to a vehicle for adjustable movement; and
a pair of cams fixedly mounted in spaced relationship along said pivot rod with facing camming surfaces, a pair of cam followers slidably mounted to said visor for axial movement between said cams and having camming surfaces facing outwardly toward said cams and a compression spring mounted between said cam followers to urge said cam followers against said cams.

26. The apparatus as defined in claim 25 wherein said cam and cam followers are collars surrounding said pivot rod.

27. The apparatus as defined in claim 26 wherein said spring surrounds said pivot rod and is positioned between said cam followers.

28. A control for a vehicle mounted visor for returning and releasably holding the visor in a predetermined position comprising:
a visor having a lighted and covered vanity mirror assembly mounted therein and including a pivot rod extending therein for pivotally mounting the visor to a vehicle for adjustable movement;
a first member coupled to said visor and engaging one side of said pivot rod; and
an elastically deformable plate having one end secured to said first member and engaging an opposite side of said pivot rod in an elastically deformed position, wherein said pivot rod includes a flat formed in said opposite side for engagement by said plate to provide a torque to said visor body to return said visor body to a predetermined position as the visor is moved toward said predetermined position and releasably hold the visor in said predetermined position.

29. A visor control for a vehicle mounted visor for returning and releasably holding the visor in a predetermined position comprising:
a visor having a lighted and covered vanity mirror assembly mounted therein and including a pivot rod extending therein for pivotally mounting the visor to a vehicle for adjustable movement;
one of a cam or cam follower coupled to said pivot rod and including a camming surface facing axially toward one end of said rod;
the other of said cam or cam follower captively and slidably secured to said visor for movement axially with respect to said pivot rod and including a camming surface axially facing an opposite end of said pivot rod; and
means for urging said cam follower into engagement with said cam such that said camming surfaces engage one another to tend to rotate said visor into an equilibrium position and releasably hold said visor in said equilibrium position.

30. The apparatus as defined in claim 29 wherein said cam and cam followers are collars surrounding said pivot rod.

31. The apparatus as defined in claim 30 wherein said urging means comprises a compression spring surrounding said pivot rod and coupled to said cam follower.

* * * * *

UNITED STATES PATENT AND TRADEMARK OFFICE
CERTIFICATE OF CORRECTION

PATENT NO. : 4,390,202
DATED : June 28, 1983
INVENTOR(S) : Carl Flowerday et al.

It is certified that error appears in the above-identified patent and that said Letters Patent is hereby corrected as shown below:

Column 7, line 40:

"of" (first occurrence) should be --to--

Column 8, line 33, Claim 10:

"portion bifurcated" should be --bifurcated portion--

Signed and Sealed this

Twentieth Day of March 1984

[SEAL]

Attest:

Attesting Officer

GERALD J. MOSSINGHOFF

Commissioner of Patents and Trademarks